US012344340B2

(12) United States Patent
Hultén et al.

(10) Patent No.: US 12,344,340 B2
(45) Date of Patent: Jul. 1, 2025

(54) METHOD AND SYSTEM ARRANGEMENT FOR VEHICLE STEERING AND VEHICLE WITH SUCH A SYSTEM

(71) Applicant: SENTIENT AB, Gothenburg (SE)

(72) Inventors: Johan Hultén, Gothenburg (SE); Jochen Pohl, Partille (SE); Lars Markström, Västa Frölunda (SE); Patrik Fagerberg, Trollhättan (SE)

(73) Assignee: SENTIENT AB, Gothenburg (SE)

( * ) Notice: Subject to any disclaimer, the term of this patent is extended or adjusted under 35 U.S.C. 154(b) by 185 days.

(21) Appl. No.: 17/639,668

(22) PCT Filed: Aug. 18, 2020

(86) PCT No.: PCT/SE2020/050876
§ 371 (c)(1),
(2) Date: Mar. 2, 2022

(87) PCT Pub. No.: WO2021/076025
PCT Pub. Date: Apr. 22, 2021

(65) Prior Publication Data
US 2022/0289288 A1 Sep. 15, 2022

(30) Foreign Application Priority Data
Oct. 13, 2019 (SE) .................... 1951159-1

(51) Int. Cl.
*B62D 6/00* (2006.01)
*B62D 5/04* (2006.01)
*B62D 17/00* (2006.01)

(52) U.S. Cl.
CPC ........... *B62D 6/008* (2013.01); *B62D 5/0463* (2013.01); *B62D 5/0484* (2013.01); *B62D 17/00* (2013.01); *B62D 5/0493* (2013.01); *B62D 6/002* (2013.01)

(58) Field of Classification Search
CPC .... B62D 6/008; B62D 5/0463; B62D 5/0484; B62D 17/00; B62D 5/0493; B62D 6/002
See application file for complete search history.

(56) References Cited

U.S. PATENT DOCUMENTS 2,553,940 A    5/1951   Quartullo
2,820,872 A    1/1958   Carr
(Continued)

FOREIGN PATENT DOCUMENTS

AR         50759 A1     11/2006
CN       1491170 A      4/2004
(Continued)

OTHER PUBLICATIONS

Effect of Wheel Geometry Parameters on Vehicle Steering, Rajvardhan et al.(Year: 2011).*
(Continued)

*Primary Examiner* — Todd Melton
*Assistant Examiner* — Oliver Tan
(74) *Attorney, Agent, or Firm* — Jeffrey S Melcher; Melcher Patent Law PLLC

(57) ABSTRACT

The present invention relates to vehicle steering system arrangement (100) comprising a vehicle suspension allowing wheels to be steered and power assisted vehicle steering with a feedback torque actuator (130), the steering feel being controlled by means of a torque and/or angle control system, TAC, (132). The vehicle suspension with steerable wheels comprises a plurality of vehicle suspension parameters and the geometry and/or dimensions of one or more of the vehicle suspension parameters or elements is/are designed to reduce or minimize the steering force required for steering the vehicle in driving. The torque and/or angle control, TAC, (132) is used for, based at least on directly or indirectly sensed and/or calculated steering wheel angle, controlling (Continued)

the wheel steer angle and providing feedback control by controlling the feedback torque actuator to generate a target feedback torque, and a target steering feel, and hence reducing or eliminating driver feedback provided by the vehicle suspension, such that the steering effort, if there is a fault in the steering control so that the assistance is lost, will be low enough for the driver to handle safely, hence without needing fail-operational steering gear.

27 Claims, 3 Drawing Sheets

(56) References Cited

U.S. PATENT DOCUMENTS

| | | |
|---|---|---|
| 4,441,572 A | 4/1984 | Ito |
| 4,624,336 A | 11/1986 | Eddy |
| 5,307,892 A | 5/1994 | Phillips |
| 5,388,658 A | 2/1995 | Ando |
| 5,406,155 A | 4/1995 | Persson |
| 5,596,252 A | 1/1997 | Shimizu |
| 5,925,082 A | 7/1999 | Shimizu |
| 6,219,604 B1 | 4/2001 | Dilger |
| 6,282,478 B1 | 8/2001 | Akita |
| 6,384,598 B1 | 5/2002 | Hobein |
| 6,484,081 B1 | 11/2002 | Nakashima |
| 6,546,322 B2 | 4/2003 | Williams |
| 6,640,173 B1 | 10/2003 | Zheng |
| 6,691,009 B1 | 2/2004 | Yao |
| 6,694,239 B1 | 2/2004 | Yao |
| 6,718,243 B1 | 4/2004 | Yao |
| 6,757,601 B1 | 6/2004 | Yao |
| 6,799,104 B2 | 9/2004 | Yao |
| 6,895,318 B1 | 5/2005 | Barton |
| 7,165,644 B2 | 1/2007 | Offerle |
| 8,073,608 B2 | 12/2011 | Hulten |
| 8,453,518 B2 | 6/2013 | Diekmann |
| 8,567,554 B2 | 10/2013 | Zaloga |
| 8,694,209 B2 | 4/2014 | Tokimasa |
| 8,751,111 B2 | 6/2014 | Wilson-jones |
| 9,180,907 B2 | 11/2015 | Deimel |
| 9,260,092 B1 | 2/2016 | Lombroz |
| 9,421,883 B2 | 8/2016 | Drako |
| 10,005,455 B2 | 6/2018 | Hulten |
| 10,351,162 B1* | 7/2019 | Katzourakis ........... B62D 5/001 |
| 11,214,302 B2 | 1/2022 | Weiefors |
| 2002/0019690 A1* | 2/2002 | Kurishige ............... B62D 6/008 180/443 |
| 2003/0014168 A1 | 1/2003 | Williams |
| 2003/0220727 A1 | 11/2003 | Husain |
| 2004/0016294 A1 | 1/2004 | Sugitani |
| 2004/0019417 A1 | 1/2004 | Yasui |
| 2004/0107032 A1 | 6/2004 | Farrelly |
| 2004/0138796 A1 | 7/2004 | Yao |
| 2004/0186641 A1 | 9/2004 | Hironaka |
| 2004/0251061 A1* | 12/2004 | Augustine ............... B62D 5/008 180/6.2 |
| 2005/0189161 A1 | 9/2005 | Zheng et al. |
| 2005/0189163 A1 | 9/2005 | Barton |
| 2005/0209751 A1 | 9/2005 | Kato |
| 2005/0234622 A1 | 10/2005 | Pillar |
| 2005/0246101 A1 | 11/2005 | Courtenay |
| 2006/0080016 A1 | 4/2006 | Kasahara |
| 2006/0289226 A1 | 12/2006 | Sugitani |
| 2007/0021889 A1 | 1/2007 | Tsuchiya |
| 2007/0144824 A1 | 6/2007 | Tamaki |
| 2007/0192005 A1 | 8/2007 | Ishikawa |
| 2007/0199764 A1 | 8/2007 | Kifuku |
| 2007/0256885 A1 | 11/2007 | Ammon |
| 2007/0299580 A1 | 12/2007 | Lin |
| 2008/0021613 A1 | 1/2008 | Hamaguchi |
| 2008/0040002 A1 | 2/2008 | Galkoswki |
| 2008/0066994 A1 | 3/2008 | Fujita |
| 2008/0109134 A1 | 5/2008 | Bolourchi |
| 2008/0164087 A1 | 7/2008 | Koyama |
| 2008/0243340 A1 | 10/2008 | Hung |
| 2009/0271070 A1 | 10/2009 | Feller |
| 2009/0271074 A1 | 10/2009 | Hulten |
| 2009/0299573 A1 | 12/2009 | Thrun |
| 2009/0312909 A1 | 12/2009 | Onuma |
| 2010/0072738 A1 | 3/2010 | Szabela |
| 2010/0168964 A1 | 7/2010 | Higashi |
| 2011/0010054 A1 | 1/2011 | Wilson-Jones |
| 2011/0272204 A1 | 11/2011 | Nell |
| 2012/0109464 A1 | 5/2012 | Mizutani |
| 2012/0199414 A1* | 8/2012 | Shimizu ................ B62D 6/008 180/446 |
| 2013/0032430 A1 | 2/2013 | Zaloga |
| 2013/0231830 A1 | 9/2013 | Van Dan Elzen |
| 2014/0157922 A1 | 6/2014 | Schneider |
| 2014/0238770 A1 | 8/2014 | Namikawa |
| 2014/0291061 A1 | 10/2014 | Deimel |
| 2015/0158528 A1 | 6/2015 | Moshchuk |
| 2015/0175197 A1 | 6/2015 | Heilig |
| 2015/0246687 A1 | 9/2015 | Takeda |
| 2015/0251541 A1 | 9/2015 | Drako |
| 2015/0259007 A1 | 9/2015 | Di Cairano |
| 2015/0329141 A1 | 11/2015 | Preijert |
| 2016/0090005 A1 | 3/2016 | Drako |
| 2016/0159390 A1 | 6/2016 | Tamaizumi |
| 2016/0272197 A1 | 9/2016 | Hulten |
| 2017/0017734 A1 | 1/2017 | Groh |
| 2017/0066476 A1* | 3/2017 | Kudo ................... B62D 5/0463 |
| 2017/0113714 A1 | 4/2017 | Guerra |
| 2017/0247032 A1 | 8/2017 | Lee |
| 2018/0086374 A1 | 3/2018 | Subaru |
| 2018/0105181 A1 | 4/2018 | Skold |
| 2018/0127025 A1 | 5/2018 | Wijffels |
| 2018/0141588 A1 | 5/2018 | Shimizu |
| 2018/0188705 A1 | 7/2018 | Linger |
| 2018/0281844 A1 | 10/2018 | Wijffels |
| 2018/0281845 A1 | 10/2018 | Wijffels |
| 2018/0319422 A1 | 11/2018 | Polmans et al. |
| 2019/0270482 A1 | 9/2019 | Nakakuki |
| 2020/0108816 A1* | 4/2020 | Velazquez Alcantar ..................... B60W 20/10 |
| 2020/0361522 A1 | 11/2020 | Weimin |
| 2021/0129839 A1 | 5/2021 | Hulten |
| 2021/0284230 A1 | 9/2021 | Dobberphul et al. |
| 2021/0389196 A1 | 12/2021 | Witts et al. |

FOREIGN PATENT DOCUMENTS

| | | |
|---|---|---|
| CN | 1867477 A | 11/2006 |
| CN | 101119884 A1 | 2/2008 |
| CN | 101450677 B | 6/2009 |
| CN | 101657345 A | 2/2010 |
| CN | 102114867 A | 7/2011 |
| CN | 102470864 A | 5/2012 |
| CN | 102612456 A | 7/2012 |
| CN | 103303361 B | 9/2013 |
| CN | 103895693 A | 7/2014 |
| CN | 105644621 A | 6/2016 |
| CN | 106494497 A | 3/2017 |
| CN | 107380255 A | 11/2017 |
| CN | 107531279 A | 1/2018 |
| CN | 107792169 A | 3/2018 |
| CN | 109153405 A | 1/2019 |
| CN | 109415058 A | 3/2019 |
| CN | 111108035 B | 5/2020 |
| CN | 111315640 B | 6/2020 |
| CN | 112074449 B | 11/2020 |
| CN | 113365900 A | 9/2021 |
| CN | 114502448 A | 5/2022 |
| CN | 118695984 A | 9/2024 |
| CN | 118871342 A | 10/2024 |
| DE | 19539101 A | 2/1997 |
| DE | 19912169 A1 | 7/2000 |
| DE | 19941464 A1 | 3/2001 |
| DE | 202011003716 | 8/2012 |
| DE | 102017203456 | 9/2018 |
| EP | 1193160 A2 | 4/2002 |
| EP | 1228941 A2 | 8/2002 |

(56) References Cited

FOREIGN PATENT DOCUMENTS

| | | |
|---|---|---|
| EP | 1577194 A1 | 9/2005 |
| EP | 1698540 A1 | 9/2006 |
| EP | 2070 804 A1 | 6/2009 |
| EP | 2070804 | 6/2009 |
| EP | 1867542 B1 | 7/2009 |
| EP | 3411280 A1 | 12/2018 |
| EP | 3684675 B1 | 7/2020 |
| EP | 3684676 B1 | 7/2020 |
| EP | 3768575 A1 | 1/2021 |
| EP | 3847077 A1 | 7/2021 |
| EP | 3887225 A1 | 10/2021 |
| EP | 4041616 A1 | 8/2022 |
| ES | 2772749 T3 | 7/2020 |
| FR | 2922848 A1 | 5/2009 |
| JP | 3178866 A | 8/1991 |
| JP | 2010047193 A  * | 3/2010 |
| SE | 1751179 C2 | 9/2017 |
| SE | 1850315 A1 | 3/2018 |
| SE | 1951159-1 | 10/2019 |
| SE | 543719 C2 | 6/2021 |
| SE | 544124 C2 | 1/2022 |
| SE | 544243 C2 | 3/2022 |
| SE | 2250335 A | 3/2022 |
| SE | 2250146 A1 | 8/2023 |
| SE | 2250676 A1 | 12/2023 |
| WO | 111997 A1 | 2/2001 |
| WO | 135884 A1 | 5/2001 |
| WO | 02/22397 A1 | 3/2002 |
| WO | 2009/095442 A1 | 6/2002 |
| WO | 2003006300 A2 | 1/2003 |
| WO | 2006005730 A1 | 1/2006 |
| WO | 2010144049 A1 | 6/2010 |
| WO | 2012043683 A1 | 4/2012 |
| WO | 2017135884 | 8/2017 |
| WO | 2017135884 A1 | 8/2017 |
| WO | 2017184064 | 10/2017 |
| WO | 2019059838 | 3/2018 |
| WO | 2019182496 | 9/2018 |
| WO | 2019059829 | 3/2019 |
| WO | 2020050759 | 3/2020 |
| WO | 2021076025 | 4/2021 |
| WO | 2023177337 | 9/2023 |
| WO | 2024019647 | 1/2024 |

OTHER PUBLICATIONS

Variable Caster Steering, IEEE, Alberding et al(Year: 2014).*

JP2010047193A Machine translation, Espacenet (Year: 2010).*

JP2010047193A machine translation, Google Patents (Year: 2010).*

Andrew S Ansara et al:Optimization of Front Suspension and Steering Parameters of an Off-road Car using Adams/Car Simulation, Sep. 30, 2017 (Sep. 30, 2017), XP055759859, Retrieved from the Internet: URL:https://www.ijert.org/research/optimiz ation-of-front-suspension-and-steering-par ameters-of-an-off-road-car-using-adamscar-simulation-IJERTV6IS090055.pdf [retrieved on Dec. 14, 2020].

Emanuele Bon Era et al: On the Influence of Suspension Geometry on Steering Feedback 11 , Applied Sciences, vol. 10, No. 12, Jun. 1, 2020 (Jun. 1, 2020), p. 4297, XP055759045, CH ISSN: 2076-3417, DOI: 10.3390/app10124297.

Office Action issued in corresponding Chinese Patent Application No. 201980058242.7, Aug. 29, 2023, pp. 1-7.

International Search Report issued in parent PCT/SE2019/050754, Nov. 29, 2019, pp. 1-2.

Written Opinion issued in parent PCT/SE2019/050754, Nov. 29, 2019, pp. 1-8.

International Search Report issued in parent PCT/SE2019/051097, Nov. 3, 2020, pp. 1-2.

Written Opinion issued in parent PCT/SE2019/051097, Nov. 3, 2020, pp. 1-6.

Search Report issued in corresponding Chinese Patent Application No. 201980078956.4, Jul. 19, 2023, pp. 1-3.

Office Action issued in corresponding Chinese Patent Application No. 201980078956.4, Jul. 19, 2023, pp. 1-5.

International Search Report issued in parent PCT/SE2020/050876, Nov. 3, 2020, pp. 1-3.

Written Opinion issued in parent PCT/SE2020/050876, Nov. 3, 2020, pp. 1-10.

RP Rajvardhan et al: Effect of Wheel Geometry Parameters On Vehicle Steering of Gravity CRC Constant Radius Cornering DOF Degrees of Freedom KPIA Kingpin Inclination Angle SAi Steering Axis Inclination SLC Single Lane Change, Sep. 30, 2010 (Sep. 30, 2010), pp. 11-18, XP055086764, Retrieved from the Internet: URL:http://www.msrsas.org/docs/sastech_journals/archives/Sept2010/2.pdf[retrieved on Nov. 5, 2013).

Andrew S Ansara et al:Optimization of Front Suspension and Steering Parameters of an Off-road Car using Adams/ Car Simulation, Sep. 30, 2017 (Sep. 30, 2017), XP055759859, Retrieved from the Internet: URL:https://www.ijert_Org/research/optimiz ation--of-front-suspension-and-steering-par ameters--of-an-off-road-car-using-adamscar-Simulation-IJERTV61S090055.pdf [retrieved on Dec. 14, 2020).

Emanuele Bon Era et al: On the Influence of Suspension Geometry on Steering Feedback 11 , Applied Sciences, vol. 10, No. 12, 1June2020 (Jun. 1, 2020), p. 4297, XP055759045, CH ISSN: 2076-3417, DOI: 10.3390/app10124297.

International Search Report issued in parent PCT/SE2023/050003, May 4, 2023, pp. 1-2.

Written Opinion issued in parent PCT/SE2023/050003, May 4, 2023, pp. 1-10.

International Search Report issued in parent PCT/SE2023/050157, Jul. 7, 2023, pp. 1-2.

Written Opinion issued in parent CT/SE2023/050157, Jul. 7, 2023, pp. 1-18.

International Search Report issued in parent PCT/SE2023/050455, Jul. 8, 2023, pp. 1-2.

Written Opinion issued in parent PCT/SE2023/050455, Jul. 8, 2023, pp. 1-11.

Search Report issued in corresponding Chinese patent application Serial No. 201780009900.4 on Mar. 16, 2020, pp. 1-3.

Office Action issued in corresponding Chinese patent application Serial No. 201780009900.4 on Mar. 20, 2020, pp. 1-10.

Decision to Grant in corresponding European Patent Application No. 17705188.5-1013, mailed Oct. 17, 2019, pp. 1.

EPO, Int'l Search Report and Written Opinion in PCT/2017/050100, Apr. 20, 2017.

Decision to Grant in corresponding European Patent Application No. 17718757.2 mailed Apr. 5, 2020, pp. 1-2.

Office Action issued in corresponding Chinese Patent Application No. 201780024423.9, Jun. 16, 2020, pp. 1-8, with translation pp. 1-3.

EPO, Int'l Search Report in PCT/2017/050382, Jul. 17, 2017.

EPO, Written Opinion in PCT/2017/050382, Jul. 17, 2017.

International Search Report issued in parent PCT/SE2018/050920, Feb. 18, 2019, pp. 1-3.

Written Opinion issued in parent PCT/SE2018/050920, Feb. 18, 2019, pp. 1-7.

International Search Report issued in parent PCT/SE2018/050966, Jan. 24, 2019, pp. 1-3.

Written Opinion issued in parent PCT/SE2018/050966, Jan. 24, 2019, pp. 1-7.

WO-2012043683-A 1 translation (Year: 2012).

CN-109415058-A (Year: 2019).

International Search Report issued in parent PCT/SE2019/050237, Jun. 13, 2019, pp. 1-8.

Written Opinion issued in parent PCT/SE2019/050237, Jun. 13, 2019, pp. 1-3.

EP-1867542-B1 translation (Year: 2009).

Swedish Search Report for Application 1951159-1, Mailed on Jun. 10, 2020.

R.S. Sharp* and R. Granger# *Electrical and Electronic Engineering, Imperial College of Science, Technology and Medicine, Exhi-

(56) References Cited

OTHER PUBLICATIONS bition Road, London SW7 2BT #Jaguar Cars Ltd, Engineering Centre, Abbey Road, Coventry CV3 4LF.

* cited by examiner

METHOD AND SYSTEM ARRANGEMENT FOR VEHICLE STEERING AND VEHICLE WITH SUCH A SYSTEM

TECHNICAL FIELD

The present invention relates to a method for vehicle steering. The invention also relates to a vehicle steering system arrangement and to a vehicle comprising such a steering system arrangement.

BACKGROUND

The steering and front suspension of vehicle are usually designed to give certain feedback and steer effects under the prerequisite that the driver applies hand force to the steering wheel causing a torque, with or without amplification by power steering (BCPS, boost-curve power steering). For BCPS, the steering feel is purely a fraction of the rack forces, with all its disturbances, friction etc. This heavily limits the freedom of vehicle design and the optimization of vehicle characteristics.

The suspension design shall also resist undesired steer effects coming from external forces, i.e. changes in wheel steer angle (between the wheel in a top view relating to forward direction of travel not introduced by the driver, and at the same time provide desired steer effect from external forces. This typically leads to heavy compromises as well as adding restrictions, as mentioned above, to suspension design and overall vehicle performance.

Even though suspension parameters can be adjusted to minimize the steering forces, they can usually not be low enough to allow driving comfortably with a nice steering feel. The need for power assistance raises typically with front axle load.

Another topic around modern vehicles and their power assisted steering is that it can be too hard to steer if the assistance is lost. To overcome this will require the power steering of a vehicle with high steering-rack load to be fail-safe, i.e. to have maintained assistance even during a fault, which will be very expensive.

Current design of suspension and power steering systems must thus meet many conflicting goals. One important criterion for designing a good steering system with a good feedback is to provide increasing torque feedback and self-centering of the steering wheel as the vehicle is turned harder, i.e. lateral acceleration. A mean of doing this is to have a certain caster offset at ground value. Caster offset at ground is a lever between the steering axis and the point of a longitudinal centre of wheel contact patch. An increase of caster offset at ground will give a clear torque feedback to the driver, overcoming friction and force reduction of the power steering. If the feedback originating from caster offset at ground is strong, it will also reduce disturbances, other than those in lateral direction, around the steering axis to become relatively small, like steer effects originating from acceleration of the vehicle.

This self-aligning design will also, to some extent, increase needed steer forces when driving slowly. At higher speed this effect is typically of major significance in relation to other forces.

Another criterion is to have steering wheel returnability at very slow speeds, where lateral acceleration forces are too low to provide it. The amount of, or the value for, the normal force lever and inclination of the steering axis towards the vehicles centre line, will create a lifting effect of the vehicle while turning away from straight ahead position. This will create a self-centering effect when releasing the steering wheel after turning.

Unfortunately, this self-aligning design will also increase needed steer forces at stand still and when driving slowly. At higher speed this effect typically loses significance in relation to other forces.

The normal force acting on the tire will also give a turning moment around the steering axis. In an idealized situation the sum of these forces from the left and right sides will balance each other. When driving on uneven roads, asymmetrically laden vehicle or on roads with lateral inclination the sum of forces will not be zero, thus creating a disturbing torque in the steering wheel.

Also, when the vehicle is driving in a curve the outside wheel has higher normal load than the inner wheel, thus adding or subtracting feedback to the driver.

A special case is tire explosions that suddenly result in asymmetrical normal forces and thus an abrupt steering torque change that can severely affect the driver's ability to keep an intended course.

In the case of heavy vehicles, this situation often leads to the death of the driver if the vehicle goes off road or to the death of people in cars of oncoming traffic.

The lever for the normal force, could, in theory at least, be set to zero to overcome the problems mentioned above. But in practice, this lever is not designed to be zero due to constraints set by other factors and practicalities.

Even if the lever could be set to zero, the effective lever will anyhow change with variation of the actual contact point between the road and wheel.

Attempts to somewhat reduce the problem of high steering forces based on compromising with steering feedback and returnability as described above have not been satisfactory.

The power steering in itself is the main solution to overcome high hand forces for the driver, especially at parking. There is conflict of the desire to have low amplification for higher speeds close to straight ahead and high amplification at lower speeds. This is solved by a highly non-linear amplification, boost-curve, which is U-shaped that tries to make a compromise between the goals, but can lead to non-linear steering feel or too high or too low steering forces at different speeds.

To overcome this speed dilemma, different ways of manipulating the boost-curve as a function of speed have been suggested. For the hydraulic steering Honda has suggested a hydraulic solution while ZF AG has electronic solutions. Such designs suffer from the drawbacks of being complex and expensive and result in an increasing sensitivity to disturbances when lower assistance is desired. It sometimes also impairs steering feel and performance.

With EPS (Electric Power Steering) the boost-curve is manipulated via software with much less cost and complexity penalties than in the hydraulic case. Still, it does not address the problem of increasing sensitivity to disturbances.

High steer forces mean that the power steering has to be able to cope with higher loads. Thus, putting higher demand on the power steering itself will increase costs, weight, max current need, and overall power consumption In order to obtain low enough, legal, steering efforts for the driver at power steering failures, the steering ratio can be increased or a larger steering wheel can be used. However, both these solutions notably compromise the steering experience for the driver.

Another means of handling power assistance failure is to increase redundancy of the system. In the case of heavy vehicles, the power steering pump can be duplicated, which however will considerably increase costs and complexity.

For EPS several sub-systems can be doubled or even tripled to achieve sufficient redundancy in the power steering system. However, the use of redundant subsystems to such an extent will increase costs and complexity, and is space demanding.

SUMMARY

It is therefore an object of the present invention to provide a vehicle steering method and a vehicle steering system arrangement respectively through which one or more of the above-mentioned problems can be solved and through which one or more of the shortcomings can be overcome.

It is a particularly an object to provide a vehicle steering method and a vehicle steering system arrangement through which steering safety can be increased.

Even more particularly it is an object to provide a method and a vehicle steering system arrangement through which steering safety can be increased when there is a loss in steering assistance, and particularly steering facilitated in case of a loss in steering assistance.

Another particular object is to provide an object to provide a method and a vehicle steering system arrangement respectively through which steering safety can be increased at normal or high speed, and even more particularly, at least to some degree, also at low or very low driving speed, e.g. down to parking speed.

It is further a particular object to provide a vehicle steering method and a vehicle steering system arrangement respectively through which braking stability can be increased.

Another particular object is to provide a vehicle steering method and a vehicle steering system arrangement respectively through which steering safety can be increased when there is a loss in steering assistance as well as braking stability can be achieved, Another particular object is to provide a vehicle steering method and a vehicle steering system arrangement respectively through which steering safety can be enhanced in case of uneven forces, e.g. due to ice or clay or unevenly distributed slippery conditions in general on the road under one side of the vehicle but not on the other, or due to sudden yaw disturbances.

Yet another particular object is to provide a vehicle steering method and a vehicle steering system arrangement respectively which is cheap and easy to implement and fabricate.

Another particular object is to provide a vehicle steering method and a vehicle steering system arrangement respectively through which steering safety can be enhanced in case of failure in a steer by wire steering system. A steer by wire system comprising at least two motors, one for driver feedback and the other for turning the wheels can have graceful degradation in case of one motor failure. With a failure of one motor, the steering arrangement essentially becomes a conventional power steering system via a mechanical connection. With the current invention, with lowered steer forces, either motor can assist the driver to steer safely, even if it is the motor intended for torque feedback, typically being of lower capacity than the motor intended for turning the wheels.

Still further it is a particular object to provide a vehicle steering method and a vehicle steering system arrangement respectively which is reliable, safe and at the same time provides a good steering feel and steering response (how the car reacts to steering input) at high, but preferably also at low speeds, particularly at all speeds exceeding parking manoeuvre speed.

It is also an object of the present invention to provide a vehicle through which one or more of the above mentioned objects can be achieved.

Therefore a vehicle steering method and a vehicle steering system arrangement respectively as initially referred to are provided having the characterizing features of the respective independent claims 1 and 17.

Advantageous embodiments are given by the respective appended dependent claims and are described in the detailed description respectively.

It will be appreciated that features of the invention are susceptible to being combined in any combination without departing from the scope of the invention as defined by the accompanying claims.

BRIEF DESCRIPTION OF THE DRAWINGS

The invention will in the following be further described, in a non-limiting manner, and with reference to the accompanying drawings, in which.

DETAILED DESCRIPTION

Figure 1:
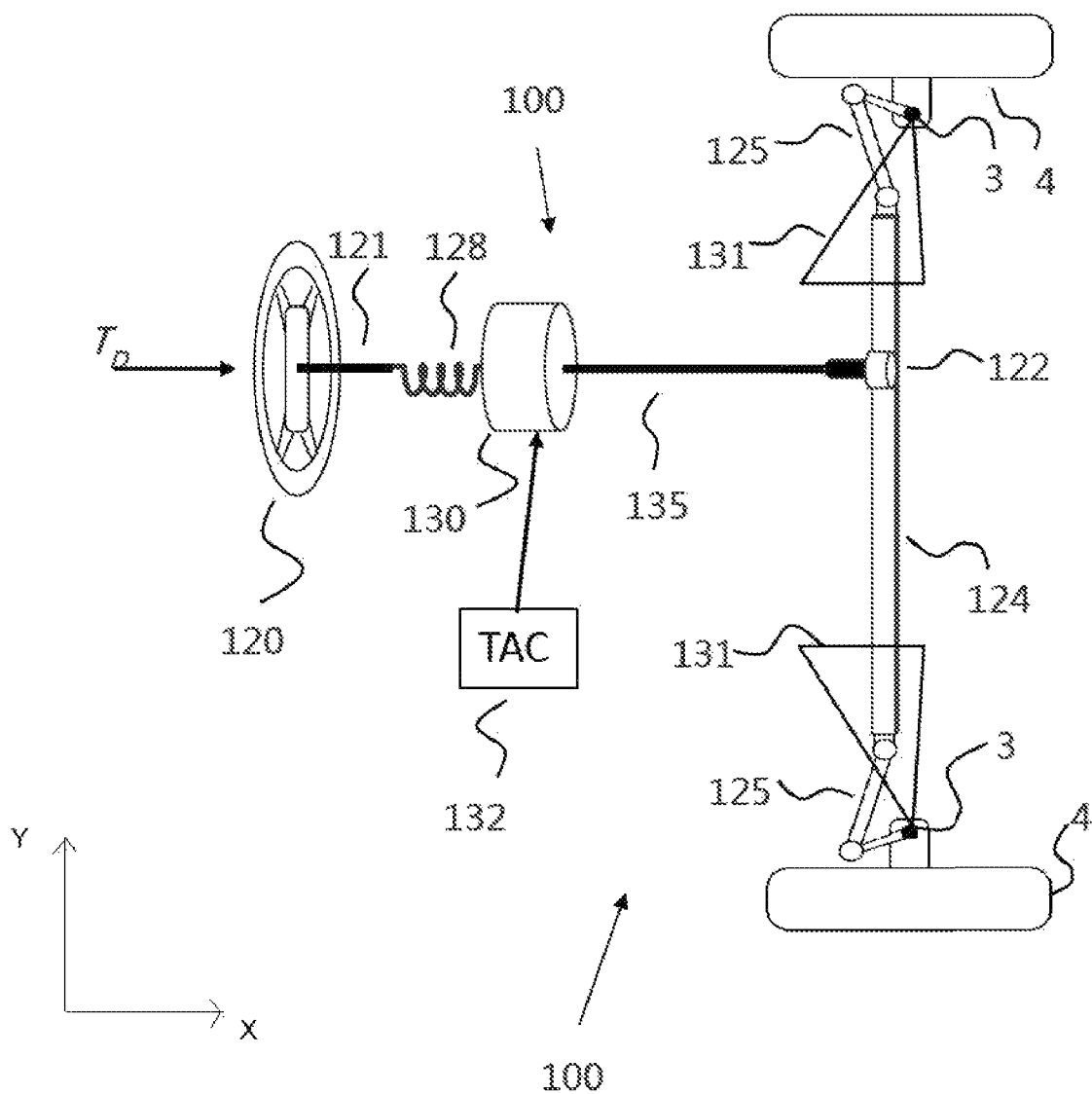
FIG. 1. schematically illustrates a steering system arrangement with TAC, Torque and/or angle control and a front suspension of a ground vehicle according to one exemplary embodiment of the present invention, FIG. 2. schematically illustrates a front view of a steered wheel and the main influencing parameters for the steering system arrangement in FIG. 1, and FIG. 3. schematically illustrates a side view of a steered wheel and the main influencing parameters of the steering system arrangement in FIG. 1.

For the purposes of describing the present invention, and to facilitate the understanding thereof, the following definitions are given, which will be relied upon in the detailed description of advantageous embodiments:

Definitions

Torque and/or angle reference control (TAC) comprises steering feel control (SFC) and/or steering position control (SPC), respectively. For the steering feel control, it is the control of the steering-wheel torque that the driver feels that is the subject matter, and in steering position control, it is the control of the road-wheel angles, and specifically for a front-wheel steered vehicle, the control of the front axle road-wheel angle, here referred to as the steering angle (see the definition below).

A steering angle is an angle in the steering system that influences the lateral acceleration or curvature of the vehicle, measured somewhere in the steering system, where such steering angles can be:

The front-wheel angle and in the case for e.g. Ackermann steering, the steering angle is defined as the mean value of the angles of the two front wheels.

The articulation angle of an articulated vehicle.

The rear-wheel steering angle in the case of a rear-wheel steered vehicle.

A combination of the front-wheel angle and the rear-wheel angle in the case of an all-wheel steered vehicle.

Power steering will also provide a means for to modulate steering feedback.

A steering position actuator is an actuator which can be used for SPC, i.e. to influence one or more of the steering angle, such as the front wheel steering angle, rear wheel steering angle, the individual steering angles of the wheels, the axle braking torque or force, the wheel braking torque or force, the driving torque or force on the individual axles, the driving torque or force on the individual wheels, the camber angle on each axle, or the camber angle on each wheel.

A specific type of steering position actuator is an angle overlay actuator. An angle overlay actuator is an actuator that is used to achieve a relative angle somewhere in the steering column. Two hardware concepts are dominating the angle overlay actuator scene, namely planetary gears (such as in the BMW concept for "Front Active Steering") and harmonic drives (such as in the Audi variable steering gear ratio).

A state is defined as a translational or rotational position, velocity or acceleration, or from these before-mentioned states derived states such as e.g. a vehicle slip angle, which is the angle between the vehicle local x-axis and the vehicle speed vector.

For SFC, Hydraulic Power Steering (HPS) has been widely used, and now Electric Power Steering (EPS) is used. In order to give the driver feedback in the SFC, the EPS is used, and will in this document be called a feedback torque actuator or only torque actuator.

Heavy vehicles and farming vehicles such as e.g. tractors require great steering assistance levels. Therefore, the assistance actuators of today are predominantly hydraulic assistance driven (because the fact that hydraulics has high power density). That means that if one would like greater controllability than standard hydraulic assistance valves result in, for functions such as e.g. Lane Keeping Aid (LKA), it is possible to add an EPS actuator above the HPS actuator, i.e. towards the steering wheel side. Therefore, for farming equipment and heavy vehicles, a combination of HPS and EPS is now emerging, where the EPS is mounted on the steering wheel side of the HPS system. The HPS actuator is used to achieve a torque reduction, an assistance, and is therefore called hydraulic assistance actuator.

An actuator is a mechanism or system that is operated mechanically or by an ECU and converts a source of energy, typically electric current, hydraulic fluid pressure, or pneumatic pressure, into a motion, force or torque.

Variable Gear Ratio (VGR) or variable steering gear ratio is a function to control the angle overlay actuator in such a way that the ratio between the steering wheel and the road wheels follows a speed dependent function. By controlling the angle overlay actuator in such a way, the steering response can be made vehicle speed dependent.

Also other functions, such as e.g. safety functions can benefit from an angle overlay actuator. Such safety functions are e.g. oversteer compensation, where the steering angle is controlled in such a way that the oversteering is reduced by a counter steering, or understeer compensation, where the function controls the steering angle in such a way that the tyre-to-road friction is used in an optimal way, reducing otherwise over-exaggerated steering angles. By these examples of steering angle control, the steering wheel does not necessarily need to move, as the angle overlay actuator adds the angle necessary to move the steering angle without moving the steering-wheel angle.

A torsion-bar torque is a torque measured by the use of a sensor that is sensitive to a twist of a specific torsion bar that is mounted somewhere in the steering column.

A steering-wheel torque is the torque resulting from the force applied by the driver to the steering wheel. This steering-wheel torque is normally approximated by the torsion-bar torque.

A driver torque is equal to the steering-wheel torque.

A signal bus is a transmission path on which signals can be read and/or transmitted.

An input signal can for example be the measure of a torque resulting from the force applied by the driver via the steering wheel, measured somewhere between the steering wheel and the wheel, or a signal from which this quantity can be derived from.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Controllability describes the ability of an external input to move the internal state, an actual value, of a system from any initial state to an arbitrary other final state, a target value, in a finite time interval, thus minimising the difference between the target value and the actual value, i.e. the control error.

A lateral acceleration feedback torque is a torque felt by the driver that corresponds to the lateral acceleration of the vehicle.

The lateral acceleration can be calculated from a vehicle model, which uses vehicle speed and steering angle as input. The lateral acceleration feedback torque, in turn, is a function (e.g. calculated, obtained from a table or a matrix) of the lateral acceleration calculated from the vehicle model.

A tyre friction torque is the torque generated by friction between the tyres and the road or a model of this friction. When turning a wheel, the friction between the tyre and road must be overcome, being the tyre friction torque.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function. The model of the tyre friction is the combination of the hysteresis and the relaxation so that e.g. an increase owing to the hysteresis torque can happen at the same time as the torque decrease owing to the relaxation. The resulting torque of the model is the sum of the two parts.

A steering system friction or a friction torque is the friction of the parts of the linkage of the steering system or a model of this friction.

The mathematical model of the steering system friction torque is a model of an angle or angular speed driven hysteresis. The maximum torque in the hysteresis can be shaped by a function so that the maximum torque is different on centre compared to off centre.

A damping torque occurs owing to damping of the tyres and the steering system or a model of this damping.

The mathematical model of the damping torque consists of some damping constant times an angular speed or translational speed, such as e.g. the rack velocity, measured somewhere in the linkage between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

A returnability torque comes from the geometry of the steering system or a model of the steering system.

A returnability torque is a vehicle speed dependent and steering-wheel angle dependent torque.

These torque contributions can all be vehicle speed dependent. The torque contributions can also be calculated via mathematical models or sensed via sensors in the vehicle or steering system.

A compensation torque is the sum of the above-mentioned tyre friction torque, the friction torque, the damping torque and the returnability torque. The parts of the compensation torque are calculated from mathematical models of the different torque parts.

A reference generator concept for steering feel is a closed loop control method where first a reference or target value is calculated and then the steering assistance is controlled to minimize the error between the target value and the corresponding measured one. Reference generator concepts for steering can be of two kinds, namely torque reference generator concepts and angle reference generator concepts.

A torque reference generator is a steering feel control concept where the steering-wheel torque is calculated in a reference generator, giving a reference steering-wheel torque and this reference steering-wheel torque is then compared to a measured steering-wheel torque and the difference, the steering wheel torque error, is fed to a controller so that the steering wheel torque error can be minimized. The reference steering-wheel torque is in other words used to control, by the use of closed loop control, the feedback torque actuator.

A target steering-wheel torque is the sum of the lateral acceleration feedback torque, the above-mentioned tyre friction torque, the friction torque, the damping torque and the returnability torque.

An angle reference generator is a steering feel control concept where the steering-wheel angle is calculated in a reference generator, giving a reference steering-wheel angle and this reference steering-wheel angle (reference feedback torque actuator angle) is then compared to a measured steering-wheel angle and the difference, the steering-wheel angle error, is fed to a controller so that this error can be minimised. In other words the reference torque actuator angle can be said to be used to control the feedback torque actuator to this reference angle.

A target steering angle, in the angle reference generator, is based on the equation of the target steering-wheel torque, where the target steering-wheel torque is the sum of the lateral acceleration feedback torque, the above-mentioned tyre friction torque, the friction torque, the damping torque and the returnability torque. If the target steering-wheel torque, in this equation is changed to the sensed or estimated driver torque, the steering angle can be derived out of this steering angle dependent equation. This derived steering angle is the target steering angle of the angle reference generator.

The parts of the target steering-wheel torque are calculated from mathematical models of the different torque parts.

A target steering-wheel angle can be calculated from the equation of steering feel, where the torsion-bar torque should be equal to the target steering-wheel torque as described above. Now, from this equation, a target steering-wheel angle can be calculated.

The parts of the target steering-wheel angle are calculated from mathematical models of the different torque parts.

A vehicle state controller, is defined as a dynamic function for achieving a target state in a vehicle in a controlled manner. That is, to minimise the difference between the target state and the actual state, i.e. the control error, in a controlled way.

A PID controller is a proportional-integral-derivative controller, which is a control loop feedback mechanism widely used in industrial control systems and a variety of other applications requiring continuously modulated control. A PID controller continuously calculates an error value, $e(t)$, as the difference between a target value and a measured process value and applies a correction based on proportional, integral, and derivative terms (denoted P, I, and D respectively) which give their name to the controller. In practical terms it automatically applies accurate and responsive correction to a control function. An everyday example is the cruise control on a road vehicle; where external influences such as gradients would cause speed changes, and the driver has the ability to alter the desired set speed. The PID algorithm restores the actual speed to the desired speed in the optimum way, without delay or overshoot, by controlling the power output of the vehicle's engine. A PID controller, the I-part of a PID controller can sometimes suffer from integral windup.

Integral windup, also known as integrator windup or reset windup, refers to the situation in a PID feedback controller where a large change in target value occurs (say a positive change) and the integral terms accumulates a significant error during the rise (windup), thus overshooting and continuing to increase as this accumulated error is unwound (offset by errors in the other direction). The specific problem is the excess overshooting.

Anti-windup is a term for a set of solution to the problem of integral windup. This problem can be addressed by:
  Initialising the controller integral to a desired value, for instance to the value before the problem.
  Increasing the target value in a suitable ramp.
  Disabling the integral function until the to-be-controlled process variable has entered the controllable region.
  Preventing the integral term from accumulating above or below pre-determined bounds.
  Back-calculating the integral term to constrain the process output within feasible bounds.

A vehicle state actuator, is an actuator that when actuated influences one or several vehicle states. Vehicle state actuators are brakes, engine, controllable four-wheel-drive clutches, controllable differentials, active dampers, electric or hydraulic wheel motors and electrically or hydraulically driven axles.

A target value, reference value or request is a set point for the actuator that is achieved by the use of either a closed loop controller and/or a feed-forward controller.

A vehicle model is a mathematical model that transforms a road-wheel angle and a vehicle speed to a number of vehicle yaw and/or lateral states, namely vehicle yaw rate and acceleration, vehicle lateral speed and acceleration and vehicle body sideslip angle.

Transformation is defined as a mathematical function or lookup table with one input value used to produce one output value. That means that a transformation can be used, with its tuneable parameters, to create a relation between the input value and the output value with arbitrary tuneable shape. A transformation can have time-varying parameters that are even dependent on other values, a so-called gain scheduling, so that the transformation is a function with parameters that themselves are functions. An example of such a transformation is a vehicle state to driver torque relation where the relation is a vehicle speed dependent continuously rising, degressive shaped function.

A steering-wheel torque measurement is a torque measured in the steering column or steering wheel or a force measured in the steering rack times the torque ratio between the steering rack and the steering wheel.

A steering angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

A vehicle axis and coordinate system where X is in the horizontal plane and in the forward direction of travel. Y is in the horizontal plane, perpendicular to X and point to the left. Z points upward.

Sensors:

An ABS sensor or wheel speed sensor is a sensor measuring wheel speed.

A rate gyro sensor measures the angular speed around an axis in yaw, pitch or roll direction.

An acceleration sensor measures acceleration in longitudinal, lateral or vertical direction.

A position sensor measures the position. It can be a local, regional or worldwide coverage.

Generally referred to as GPS.

A brake pedal sensor indicates if the pedal pressed.

A break pressure sensor measures the pressure in the brake system.

The term TAC (Torque and/or Angle reference generator control concept) is used for the SFC and/or for the SPC.

FIG. 1 is a schematic figure of a steering system 100. There is a linkage between the front axle steered wheels 4 and a torque actuator 130. The linkage consists of a steering rack 124 with associated tie rods 125 connected via a pinion 122 to a column axle 135 to the torque actuator 130. The feedback torque is actuated by the torque actuator 130, which consists of an assistance motor which is controlled by a TAC 132 (Torque and/or Angle Controller). The TAC 132 will control the torque feedback to the driver and control the steered wheels 4 angle.

One example of torque and/or angle control is described in WO2010144049, the content of which herewith is incorporated herein by reference. An example of torque and/or angle control is also described in WO2019182496, by the same Applicant, the content of which herewith is incorporated herein by reference, wherein the steering angle and the vehicle speed are used to achieve a target steering-wheel torque. The target steering-wheel torque is calculated using mathematical models. As an example the target steering-wheel torque includes one or more of the following torque contributions: lateral acceleration feedback torque, steering system friction torque, tyre friction torque, damping torque and steering-wheel self-alignment torque. The mentioned feedback torque actuator is then controlled via a closed loop current control to achieve said target steering-wheel torque. Here, the target steering-wheel torque is first transformed to a target motor current, and this target motor current is compared with an actual motor current, where the difference between the two will form a control error. A controller is then used to minimise this control error to achieve the target current and hence the target steering-wheel torque.

In FIG. 1, above the torque actuator 130 there is a torsion bar 128 with a torque sensor for measuring the driver torque, i.e. the torque caused by the force applied by the driver, TD, in the steering wheel 120, which torque is transmitted through the steering wheel axle 121 to the torsion bar 128. The steered wheels 4 are attached to the vehicle and arranged so they can be turned around a steering-axis 3. The steering-axis 3 orientation is determined by the design of the suspension 131.

Figure 2:
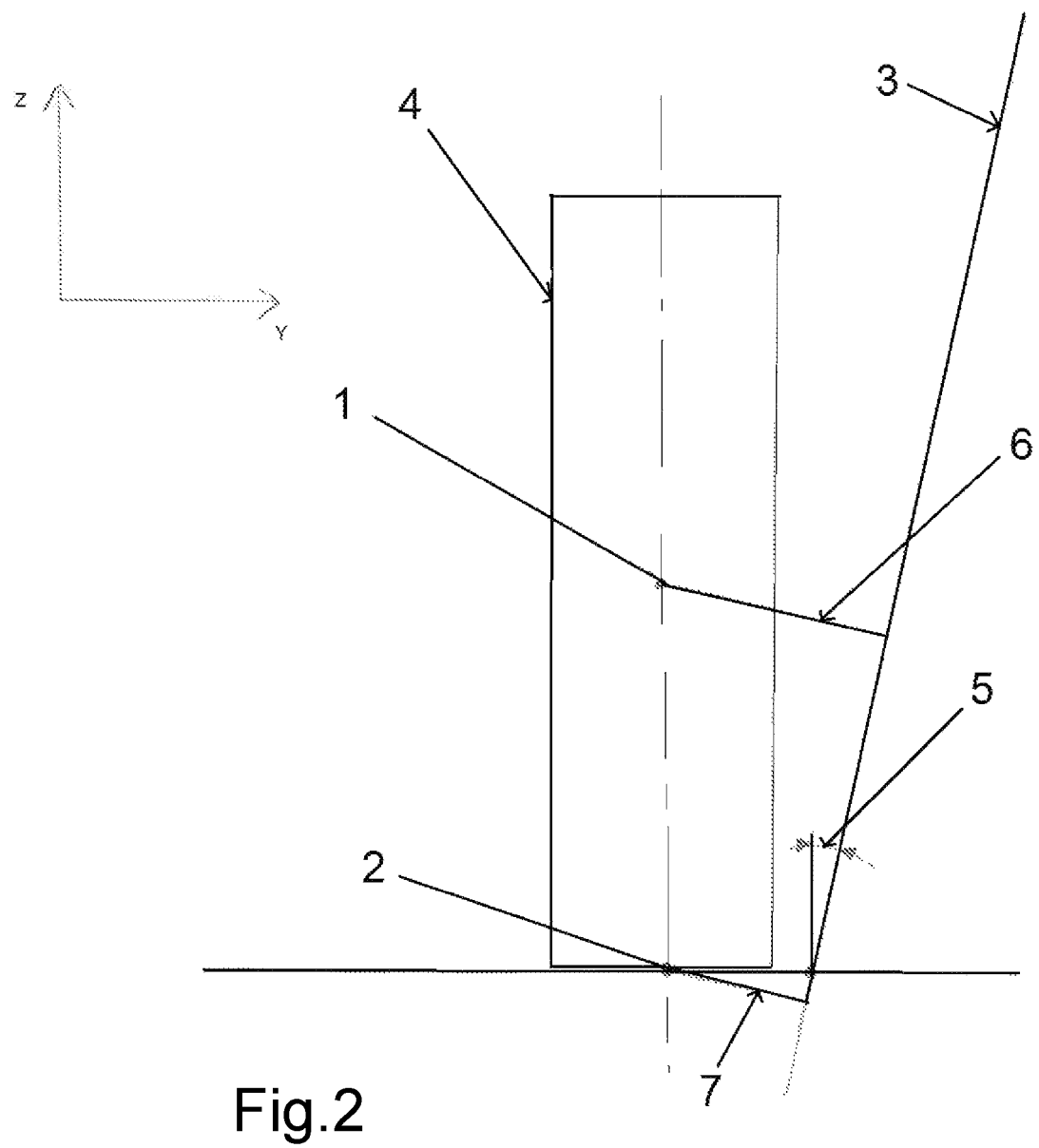

FIG. 2 is a schematic back to front view of a steered wheel 4 illustrating the main parameters influencing steering characteristics. The wheel 4 is steered around the steering axis 3. There is a distance between the wheel centre 1 perpendicular to the steering axis 3 denoted normal steering-axis offset 6 at wheel centre. The normal steering-axis offset at ground 7 is the distance from wheel contact centre 2 perpendicular to the steering-axis 3. There is a steering-axis inclination angle 5 between the Z axis and the normal projection of the steering-axis 3 on to the YZ plane.

Figure 3:
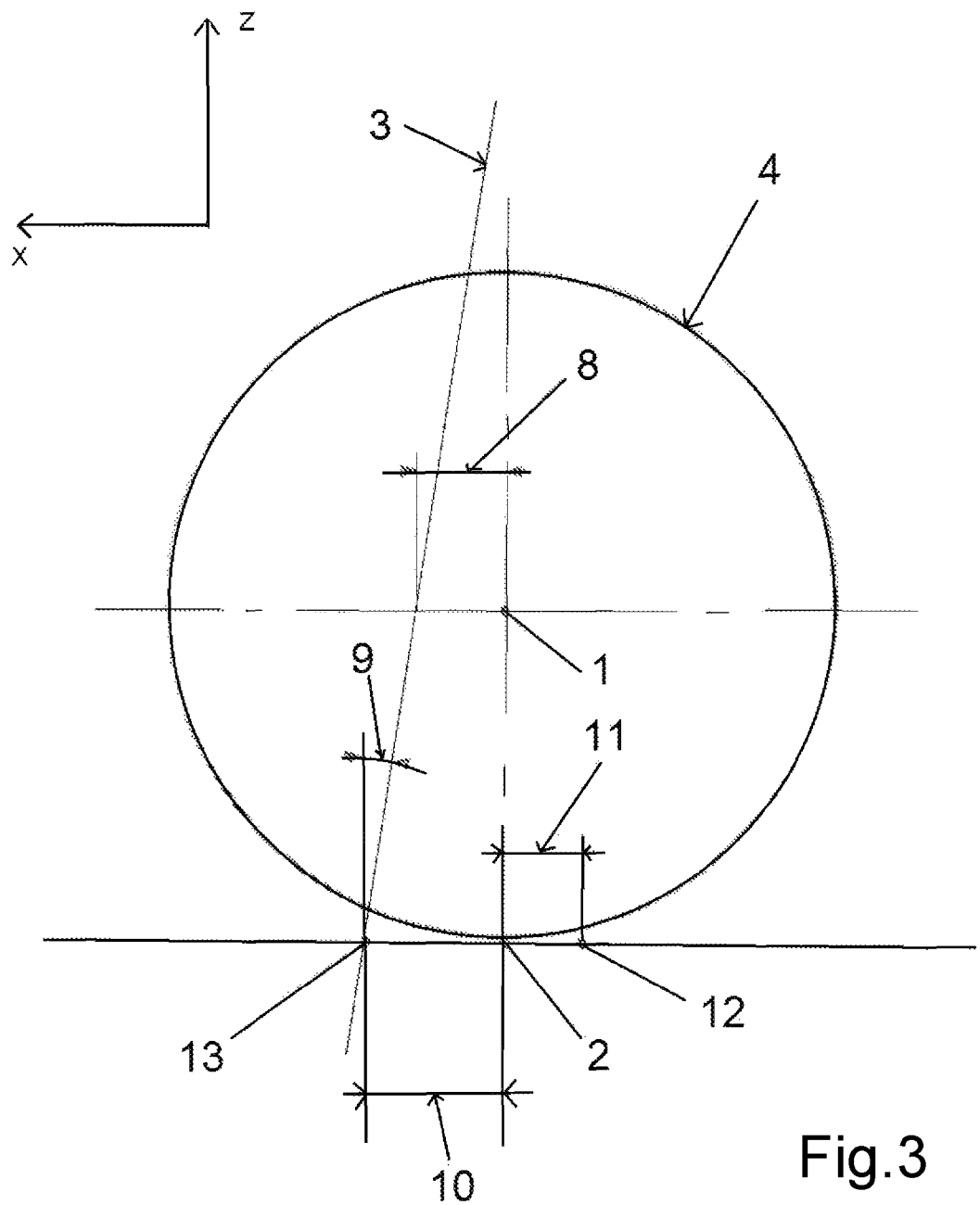

FIG. 3 is a schematic side view of a steered wheel 4 and the main influencing parameters referred to above. The steered wheel 4 is turned around the steering-axis 3. There is a caster angle 9 between the Z axis and the normal projection of the steering-axis 3 on the XZ plane. The intersection of steering-axis 3 with the road plane is the steering-axis road intersection point 13. The caster offset at wheel centre 8 is the distance between the projection of the wheel centre 1 and the projection of the steering-axis 3 on to a plane which is normal to the XY plane and parallel to the intersection of the wheel plane with the XY plane. The caster offset at ground 10 is the distance in the X direction from the steering-axis road intersection point 13 to the wheel contact centre 2. The wheel ground lateral force point 12 is the point where the sum of the lateral forces between the wheel and ground is located. The pneumatic trail 11 is the distance between wheel contact centre 2 and the wheel ground lateral force point 12 in the X direction.

As referred to above, a purpose of the present invention is to, at least in part, eliminate or minimize one or more of the constraints limiting the design of vehicles usually using BCPS by instead using TAC (or TAC in combination with BCPS) to achieve improvements of characteristics. The use of TAC will also enable desired steer effects for different vehicle states, giving opportunities not even possible for conventional BCPS and suspension layout that is heavily limited by external forces and geometry.

By using TAC to provide feedback and wheel angle control and simultaneously reduce caster offset at ground 10 (caster trail) plus pneumatic trail 11 close to zero, very low or zero (or even negative) steer forces can be achieved even with high lateral forces at the tire contact patch, while providing desired steering feedback to the driver. Caster offset at ground 10 is dominated by three parameters, and to some extent, the combination of these, namely caster angle 9, caster offset at wheel centre 8 and wheel diameter. With increasing caster angle 9 there will be a larger caster offset at ground 10. Under the condition that there is an amount of caster angle 9, i.e. the angle≠0, a larger wheel will also increase, or rather amplify the caster offset at ground 10. With increasing caster offset at wheel centre 8, caster offset at ground 10 will increase subsequently, but independently from caster angle 9 and wheel diameter. When setting the combination of caster angle 9, caster offset at ground 10 and wheel diameter to achieve low steering forces in general, and for low hand forces at power steering failure in particular, certain draw backs will arise for normal driving. A major drawback is that the feedback force from the wheel, providing the feedback from lateral acceleration etc. will be very low and the assistance provided from traditional BCPS will feel over assisted with too low lateral feedback to the driver. The legal requirement for hand forces at power steering failure are only for very low speeds where the lateral forces are low. In higher speeds it is easier to end up with higher lateral forces for normal driving. In this situation a power steering failure is more critical due to speed itself, giving shorter time to react promptly and efficiently and the kinetic energy is larger which in turn of an accident will result in higher crash violence. The invention will be specifically good at improving this situation. It will be effective for normal steering gears as well as Steer by Wire Steering systems with mechanical back-up at failure. Bonus from lower steer forces is a less expensive power steering, less maximum current need, lower energy consumption overall and a lighter steering system. Another advantage of having a small caster offset at ground 10 is that the vehicle will be less prone to a front end vibration phenomena denoted shimmy.

Another source of feedback to the driver via the steer wheel comes from the normal steering-axis offset at wheel centre 6 being the lever around steering axis 3 feeding the normal forces from the tires into the steering linkage. In the ideal situation running straight ahead, the sum of normal forces from left and right side are cancelling each other out. While cornering the normal force are not cancelled out since the outside tire will take more normal force than the inner tire. In the more common suspension designs, i.e. positive value of normal steering-axis offset at wheel centre 6 and positive value of caster angle 9 the normal force during cornering will give negative feedback to the driver, somewhat counteracting the forces from lateral direction in the wheel ground lateral force point 12. In theory, the forces from the feedback from lateral forces and normal forces could be balanced out to give low steering efforts at Power Steering (PS) failure. This is however not possible with BCSP, since it will give a very poor quality of the feedback to the driver at normal driving, since the desired signal is very low and sensitive to unwanted disturbances. This would require that the normal steering-axis offset at wheel centre 6 has a certain value≠0 which in turn will result in some negative effects. The normal steering-axis offset at wheel centre 6 will in itself also contribute with disturbance e.g. feedback originating from asymmetrically, left to right, laden vehicle, load shift due to cambered roads, vertical force input from uneven roads, sensitivity to vibrations caused by imbalanced wheel etc. A very special case is when the vehicle is exhibited to a tire explosion at the front. The sudden and strong difference in normal forces will generate a steer effect that might not be possible for the driver to sufficiently counteract and thus leading to deviation from the intended path. If it is a heavy vehicle, this often leads to going off the road or into oncoming traffic, both cases involving a high risk of lethal outcome.

In summary for BCPS, the normal steering-axis offset at wheel centre 6 can for many reasons be desired to be kept zero or low, but for other attributes and practical reasons it is better to have a higher value. This leads to a compromise that heavily restricts optimal performance for both normal driving and safe steerability during PS failure. All of these drawbacks will be overcome when using low force feedback suspension geometry in combination with TAC, providing desired feedback in normal driving situations, while the geometry itself will provide sufficiently low steering forces at PS failure with acceptable feedback quality. The TAC principle of assisting the driver to achieve desired steer angle and resulting path, rather than only giving some added forces like BCPS, as described above, will effectively support the driver to stay on track, even in the event of a tire explosion.

As described in the text above, to achieve low steering efforts at PS failure will usually, for BCPS, require that the normal steering-axis offset at wheel centre 6 has a certain value≠0. If normal steering-axis offset at wheel centre 6 is optimised for low steer forces, i.e. normal steering-axis offset at wheel centre 6 close to zero, usually give the effect of a negative normal steering-axis offset at ground 7 because of the value of steering-axis inclination angle 5. While a normal steering-axis offset at ground 7 can generate steer effects beneficial for braking at split-mu, it can have adverse steer effects for stability when braking in a curve, typically leading to compromise between the two attributes and also for generating some steering wheel returnability at low speeds. When TAC is used instead of BCPS, the steer effects are shaped within the angle controller with algorithms.

For braking in a curve, it is desirable to have a countersteer effect, i.e. reducing the steer angle when the brakes are applied. The angle controller will reduce the steer angle when braking in a curve is detected. The controller will detect braking by monitoring one or more sensors in combination. The sensors are e.g. one or more of the switch for brake pedal application, brake pressure sensor, (ABS) wheel speed sensors, longitudinal acceleration sensor, pitch gyro sensor and positioning sensors like GPS. That the vehicle is running in a curve will be detected from monitoring one or more sensors in combination. The sensors are (ABS) e.g. wheel speed sensors, lateral acceleration sensor, yaw rate gyro sensor, steering wheel angle sensor, steering wheel torque sensor A similar case is retardation in a curve but without application of the brake pedal. In this case the signals from brake pedal application and brake pressure sensors are not used.

For braking at split-mu, i.e. when one side of the wheels of the vehicle have good grip and the wheel on the other side of the vehicle exhibits poor grip, the different brake force from left to right side will create a turning moment on the vehicle in the direction towards the side with good grip. In this case it is desirable to have steer effect to the side with poor grip to counteract the turning moment to achieve the path that the driver is indicating by the steering wheel input. The angle controller will add the counteracting steer angle when braking on split-mu is detected. The controller will detect braking by monitoring one or more sensors in combination. The sensors are e.g. one or more of the switch for brake pedal application, brake pressure sensors, (ABS) wheel speed sensors, longitudinal acceleration sensor, pitch gyro sensor and positioning sensors like GPS.

For good turn-in, i.e. making a step steer input on the steering wheel, it is desired to have a higher steered wheel response in the transient phase than steady state cornering. This will make the car feel more responsive since the phase lags between steering input and response in the vehicle will be lower. The traditional way of achieving this is to have some rollundersteer coming from the suspension geometry during roll which reduces the steered wheel angle when the vehicle rolls, i.e. leaning to one or the other side. The drawback is that this typically leads to toe-in changes when going over bumps etc. that can cause course instability. Since it also relies on the roll angle of the vehicle, it can be hard to get the desired effect since it is also desirable to have a flat vehicle behaviour, i.e. low roll angle when cornering. With TAC the steered wheel angle can be set higher for the transient cornering phase and lower for steady state cornering without have disturbing steer effects for other conditions. The controller will detect transient cornering by monitoring one or more sensors in combination, e.g. one or more of steering wheel angle sensor, steering wheel torque sensor, lateral acceleration sensor, yaw rate gyro sensor. The effect shall be speed dependent by also using the vehicle speed information from (ABS) wheel speed sensors and/or positioning data from a positioning system, e.g. GPS.

When TAC is used instead of BCPS, the steer effects are precisely achieved as described above within the control algorithms, as is the steering wheel returnability, the normal steering-axis offset at wheel centre 6 and steering-axis inclination angle 5 can be optimised for lowering the steer forces. Traditionally a low steering-axis inclination angle 5 has to some extent be chosen for lowering the steer forces, but then only with the compromise of poor returnability at low speeds. Also, due packaging reasons, a low steering-axis inclination angle 5 can be hard to achieve and complicated front suspension designs with several ball joints have been used to achieve a low steering-axis inclination angle 5 with desired normal steering-axis offset at ground 7 and normal steering-axis offset at wheel centre 6. As other low steering-axis inclination angle 5 designs these will also suffer from poor returnability, but can also experience from cost, break down, friction or lash. With the current invention, a low steer force design with low steering-axis inclination angle 5 will rely on the control functions for returnability. As the steer effects from longitudinal force are controlled by functions as well, rather than the normal steering-axis offset at ground 7 and normal steering-axis offset at wheel centre 6, this will allow for simpler suspension designs that still can be optimised for low steer forces enabling good steerability at PS failure.

Another reason for keeping normal steering-axis offset at wheel centre 6 low is that it will also make the suspension geometry less sensitive to transmitting torque disturbances originating from asymmetrical left and right wheel drive torque up to the driver. Unequal drive torque can be of unwanted nature as from friction in the differential or desired differences in drive torque coming from torque vectoring systems. But, as mentioned before, keeping normal steering-axis offset at wheel centre 6 low or zero will not minimize steer forces. The current invention where TAC can, together with the normal steering-axis offset at wheel centre 6 providing low steer forces, still provide almost full insensitivity to any arising torque steer effects thanks to the control design for steer angle and driver feedback. It will as well be insensitive to wandering wheel contact centre 2 in the lateral direction of tire, not even possible for a traditional front suspension. Particularly it is important, that the combination of steering geometry is optimised for low rack forces, but still with self-centering forces to comply with the Uniform provisions concerning the approval of vehicles with regard to steering equipment, UN Regulation No. 79, which must be complied with for any party seeking a UN type approval for their vehicle, will make loss of assistance possible to safely be handled by the driver for a much wider range of front axle loads at the same time as TAC provides extremely good steering feel.

It should be clear that the invention is not limited to the specifically illustrated embodiments, but that it can be varied in a number of ways within the scope of the appended claims.

The invention claimed is:

1. A method for vehicle steering in a vehicle with a vehicle suspension allowing wheels to be steered and comprising a power assisted vehicle steering system with one or more feedback torque actuator(s), wherein steering feel is controlled by a torque and/or angle control system, TAC, directly or indirectly sensing or calculating at least a steering wheel angle and steering wheel torque and controlling the one or more feedback torque actuator(s), wherein the TAC comprising a closed-loop controlled torque or angle reference generator, wherein there being a linkage between front axle steered wheels and the one or more feedback torque actuator (s), the linkage comprising a steering rack with associated tie rods connected via a pinion to a column axle to the one or more torque actuator(s), and a steering wheel connected to the one or more torque actuators, and wherein the vehicle suspension allowing the front axle steered wheels of the vehicle to be steered and comprises or is defined by a plurality of vehicle suspension parameters or elements, the method comprising:

selecting or designing geometry and/or dimensions of one or more of the vehicle suspension parameters or elements to reduce or minimize a steering force required for steering the vehicle in driving, in combination with, using the torque or angle reference generator for controlling the one or more feedback torque actuator(s) by calculating a target feedback steering angle and/or a target steering wheel torque, and for, based on at least the directly or indirectly sensed and/or calculated steering wheel angle and/or steering wheel torque, controlling the wheel steer angle and providing feedback control by minimizing error between the calculated target feedback steering angle or the calculated target feedback torque and the directly or indirectly sensed and/or calculated steering wheel angle or steering wheel torque, and thus also reducing or eliminating need for driver feedback provided by the vehicle suspension, such that the steering effort, if there is a fault in the steering control so that the steering assistance is lost, will be low enough for the driver to handle safely, hence rendering the need for fail-operational steering gear superfluous.

2. The method according to claim 1, wherein the vehicle suspension parameters or elements comprise steering axis orientation defining parameters.

3. The method according to claim 2, wherein a vehicle suspension parameter or element comprises a caster offset at ground distance, caster trail, and in that the caster trail is designed to be between −40 and +20 mm, and in that suspension influencing parameters dominating the caster trail are caster angle, caster offset at the wheel center and wheel radius.

4. The method according to claim 2, wherein a vehicle suspension parameter or element comprises a caster offset at ground distance, caster trail, and in that the caster trail is designed to be between −20 and +10 mm, and in that suspension influencing parameters dominating the caster trail are caster angle, caster offset at the wheel center and wheel radius.

5. The method according to claim 2, wherein a vehicle suspension parameter or element comprises a caster offset at ground distance, caster trail, and in that the caster trail is designed to be between −10 and +5 mm, and in that suspension influencing parameters dominating the caster trail are caster angle, caster offset at the wheel center and wheel radius.

6. The method according to claim 2, wherein a vehicle suspension parameter or element comprises a caster offset at ground distance, caster trail, and in that the caster trail is designed to substantially 0, and in that suspension influencing parameters dominating the caster trail are caster angle, caster offset at the wheel center and wheel radius.

7. The method according to claim 1, wherein the vehicle suspension parameter or element comprises a steering axis inclination, and in that the steering axis inclination is designed to be between −2° and +8°.

8. The method according to claim 1, wherein the reference generator is a feedback torque reference generator for the calculation of a target feedback torque and that the assistance torque is controlled so that the feedback torque error is minimized, and in that at least one of the one or more actuator(s) is closed-loop controlled.

9. The method according to claim 1, wherein the reference generator is a steering angle reference generator for calculation of a target steering angle and that the assistance torque is controlled to minimize a steering angle error, and in that at least one of the one or more actuator(s) is closed-loop controlled.

10. The method according to claim 1, wherein the measurement of the at least one input signal comprises using a wheel speed sensor or a drive axle speed sensor, and in that the method further comprises the step of: calculating the vehicle speed using said at least one input signal.

11. The method according to claim 1, further comprising the step of determining the steering angle, comprising any angle or rack position in the steering system, from an additional input signal from the at least one sensor comprising an angle or position sensor located in the steering column or elsewhere in the steering system, the steering angle being a sensed angle times a ratio between a rotation or translation of a sensor element of the sensor and the rotation at the reference steering angle.

12. The method according to claim 1, wherein the one or more feedback torque actuator(s) provides all steering assistance actuator functionality.

13. The method according to claim 1, wherein the vehicle suspension parameter or element comprises a steering axis inclination, and in that the steering axis inclination is designed to be substantially 0°.

14. The method according to claim 1, wherein the vehicle suspension parameter or element comprises a steering axis inclination, and in that the steering axis inclination is designed to be between −1° and +3°.

15. A vehicle steering system arrangement in a vehicle with a vehicle suspension allowing wheels to be steered and comprising:
- a power assisted vehicle steering system with one or more feedback torque actuator(s),
- wherein the steering feel is controlled by means of a torque and/or angle control system, TAC, directly or indirectly sensing or calculating at least a steering wheel angle and a steering wheel torque and controlling the one or more feedback torque actuator(s),
- wherein there being a linkage between front axle steered wheels and the one or more feedback torque actuator(s), the linkage comprising a steering rack with associated tie rods connected via a pinion to a column axle to the one or more torque actuator(s), and a steering wheel connected to the one or more torque actuators,
- wherein the controllable vehicle suspension allows the front axle steered wheels to be steered and comprises or is defined by a plurality of vehicle suspension parameters or elements,
- the geometry and/or dimensions of one or more vehicle suspension parameters or elements is/are designed or selected to reduce or minimize the steering force required for steering the vehicle in driving, and
- the TAC comprises a closed-loop controlled torque or angle reference generator for controlling the one or more feedback torque actuator(s) by calculating a target feedback steering angle and/or a target steering wheel torque and for, based at least on the said directly or indirectly sensed and/or calculated steering wheel angle and/or steering wheel torque, control the wheel steer angle, and provide feedback control by minimizing error between the calculated target feedback steering angle or the calculated target feedback torque and the directly or indirectly sensed and/or calculated steering wheel angle or steering wheel torque, and hence reducing or eliminating the need for driver feedback provided by the vehicle suspension, such that the steering effort if the steering assistance is lost or if there is a fault in steering control, will be low enough for the driver to handle safely, hence without fail-operational steering gear.

16. The vehicle steering system arrangement according to claim 15, wherein the vehicle suspension parameters or elements comprise steering axis orientation defining parameters.

17. The vehicle steering system arrangement according to claim 16, wherein at least one of the/a vehicle suspension parameters or elements comprises a caster offset at ground distance, caster trail, and in that the caster trail is designed to be between −40 and +20 mm, and in that suspension influencing parameters dominating the caster trail are caster angle, caster offset at the wheel center and wheel radius.

18. The vehicle steering system arrangement according to claim 16, wherein the/a vehicle suspension parameter or element comprises a caster offset at ground distance, caster trail, and in that the caster trail is designed to be between −20 and +10 mm and in that suspension influencing parameters dominating the caster trail are caster angle, caster offset at the wheel center and wheel radius.

19. The vehicle steering system arrangement according to claim 16, wherein the/a vehicle suspension parameter or element comprises a caster offset at ground distance, caster trail, and in that the caster trail is designed to be between −10 and +5 mm and in that suspension influencing parameters dominating the caster trail are caster angle, caster offset at the wheel center and wheel radius.

20. The vehicle steering system arrangement according to claim 16, wherein the/a vehicle suspension parameter or element comprises a caster offset at ground distance, caster trail, and in that the caster trail is designed to be substantially 0 and in that suspension influencing parameters dominating the caster trail are caster angle, caster offset at the wheel center and wheel radius.

21. The vehicle steering system arrangement according to claim 15, wherein at least one of the vehicle suspension parameters or elements comprises a steering axis inclination, and in that the steering axis inclination is designed to be between −2° and +8°.

22. The vehicle steering system arrangement at least according to claim 15, wherein the reference generator is a feedback torque reference generator for the calculation of a target feedback torque and that the assistance torque is controlled so that the feedback torque error is minimized, and in that at least one of the one or more actuator(s) is closed-loop controlled.

23. The vehicle steering system arrangement according to claim 15, wherein the reference generator is a steering angle reference generator for calculation of a target steering angle and that the assistance torque is controlled to minimize a steering angle error, and in that at least one of the one or more actuator(s) is closed-loop controlled.

24. A vehicle with a vehicle suspension allowing wheels to be steered and a power assisted vehicle steering system, wherein the vehicle steering system comprises a vehicle steering system arrangement as recited in claim 15.

25. The vehicle steering system arrangement according to claim 15, wherein the/a vehicle suspension parameter or element comprises a steering axis inclination, and in that the steering axis inclination is designed to be substantially 0°.

26. The vehicle steering system arrangement according to claim 15, wherein the/a vehicle suspension parameter or element comprises a steering axis inclination, and in that the steering axis inclination is designed to be between −1° and +3°.

27. A vehicle steering system arrangement in a vehicle with a vehicle suspension allowing wheels to be steered and comprising:
- a power assisted vehicle steering system with one or more feedback torque actuator(s),
- wherein the steering feel is controlled by means of a torque and/or angle control system, TAC, directly or indirectly sensing vehicle state parameters or calculating steer effects introduced by a driver comprising steering wheel angle and a steering wheel torque and controlling the one or more feedback torque actuator(s), wherein the TAC comprises one or more vehicle state sensors for monitoring and measuring one or more vehicle states;
- wherein there being a linkage between front axle steered wheels and the one or more feedback torque actuator(s), the linkage comprising a steering rack with associated tie rods connected via a pinion to a column axle to the one or more torque actuator(s), and a steering wheel connected to the one or more torque actuators, wherein the TAC comprises algorithms for determining steer effects additional to steer effects introduced by a driver to enhance the extent to which the vehicle follows the drivers intention, wherein values of the additional steer effects are derived from the monitored and measured vehicle state(s) with a mathematical model describing vehicle behavior; and wherein the TAC comprising a closed-loop controlled torque and/or angle generator and the TAC is arranged to be used for, based on the measurements by the one or more sensors monitoring the one or more of the vehicle state parameters, controlling the wheel steer angle, and provide feedback control by controlling the one or more feedback torque actuator(s) to generate a feedback torque, and a target steering feel and said additional steer effects, and that the additional steer effects hence are substantially independent of vehicle suspension.

* * * * *